United States Patent [19]
On

[11] Patent Number: 6,115,130
[45] Date of Patent: Sep. 5, 2000

[54] METHOD OF RECOGNIZING PRINTING REGION

[75] Inventor: Jae-Gyoung On, Seoul, Rep. of Korea

[73] Assignee: SamSung Electronics Co., Ltd., Kyungki-do, Rep. of Korea

[21] Appl. No.: 09/083,665

[22] Filed: May 22, 1998

[30] Foreign Application Priority Data

May 22, 1997 [KR] Rep. of Korea ...................... 97-19892

[51] Int. Cl.[7] ................................................ G06K 15/00
[52] U.S. Cl. ............................................................ 358/1.1
[58] Field of Search ................................... 358/449, 488, 358/474, 497, 494, 1.1; 355/244

[56] References Cited

U.S. PATENT DOCUMENTS

| 4,839,741 | 6/1989 | Wilson ..................................... 358/293 |
| 4,947,345 | 8/1990 | Paradise et al. ........................ 358/442 |
| 5,019,916 | 5/1991 | Ogura ...................................... 358/401 |
| 5,198,853 | 3/1993 | Ichihara et al. ......................... 355/244 |
| 5,673,126 | 9/1997 | Ando ....................................... 358/488 |
| 5,805,308 | 9/1998 | Tanaka et al. .......................... 358/488 |
| 5,805,970 | 9/1998 | Kasamatsu .............................. 358/499 |
| 5,920,406 | 7/1999 | Amidei .................................... 358/449 |
| 5,973,797 | 10/1999 | Tanaka et al. .......................... 358/488 |

Primary Examiner—Jerome Grant, II
Attorney, Agent, or Firm—Robert E. Bushnell, Esq.

[57] ABSTRACT

A method of recognizing a printing region, including the steps of scanning a first block of a document divided into a plurality of blocks; confirming a point of converting black data at a starting point into white data; detecting a point of starting white data of predetermined lines continuously input within a single block; and setting as a scanning starting point a value obtained by subtracting the white data starting point from the number of dots corresponding to a resolution and then adding 1 thereto.

10 Claims, 6 Drawing Sheets

METHOD OF RECOGNIZING PRINTING REGION

CLAIM OF PRIORITY

This application makes reference to, incorporates the same herein, and claims all benefits accruing under 35 U.S.C §119 from an application entitled *Method Of Recognizing Printing Region* earlier filed in the Korean Industrial Property Office on May 22 1997, and there duly assigned Ser. No. 97-19892 by that Office.

BACKGROUND OF THE INVENTION

1. Field of the Invention

The present invention relates to a multi-tasking system. More particularly, it relates to a method of recognizing a document size for scanning only a text area of a document with respect to a shuttle scanner's slidable distance.

2. Discussion of Related Art

In recent years, several office automation machines have been combined into one system. Remarkable progress has been made toward the development of a multi-tasking system by combining a printer, a facsimile machine, a scanner, together with other components of image formation equipment. Exemplary practice in the art is found in the structure illustrated by U.S. Pat. No. 4,839,741 to Charles D. Wilson entitled *Image Reproducing Apparatus With CCD Scanner And Bubble Jet Printer Simultaneously Driven By A Commeon Belt In Opposite Directions And Operated Asynchronously;* U.S. Pat. No. 4,947,345 to Elizabeth M. Paradise et al. entitled *Queue Management System For Multi-Function Copier, Printer, and Facsimile Machine;* and U.S. Pat. No. 5,019,916 to Masaaki Ogura entitled *Digital Copier With A Facsimile Function.*

I have noticed that when scanning with a multi-tasking system that uses shuttle scanning, a portion of the print-out is in black unless a pre-scan mechanism is used. A multi-tasking system that is a combination of a laser scanner, a printer and a facsimile, provides the performance of a stand-alone facsimile unit and copy machine cannot have such a pre-scan mechanism. In some cases, such as when using A4-sized print media, a portion of the printout is in black where the scanner does not pick up any reflection because the paper is smaller than in the area scannned. This causes unnecessary ink consumption and low quality print-out.

SUMMARY OF THE INVENTION

An object of the present invention is to provide a method of discriminating a printing region of document in a multi-tasking system using a shuttle scanner module by which an actual text of document is scanned, thus preventing a black print-out.

Another object of the present invention is to provide a method of discriminating a printing region of document in a multi-tasking system using a shuttle scanner module, thereby preventing printing on the rest of the document other than its actual printing region, and reducing ink consumption.

Still another object of the present invention is to provide a method of discriminating a printing region of document in a multi-tasking system using a shuttle scanner module, for the purpose of enhancing the print quality.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention provides a method of recognizing a printing region for a multi-tasking system using a shuttle scanner module, including the steps of scanning a first block of a document divided into a plurality of blocks; confirming a point of converting black data at a starting point into white data; detecting a point of starting white data of predetermined lines continuously input within a single block; and setting as a scanning starting point a value obtained by subtracting the white data starting point from the number of dots corresponding to a resolution and then adding 1 thereto. A point when white data of more than 12 lines are continuously input in a single shuttle block, is recognized as a scanning starting point.

It is to be understood that both the foregoing general description and the following detailed description are exemplary and explanatory and are intended to provide further explanation of the invention as claimed.

BRIEF DESCRIPTION OF THE ATTACHED DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

Figure 7B:
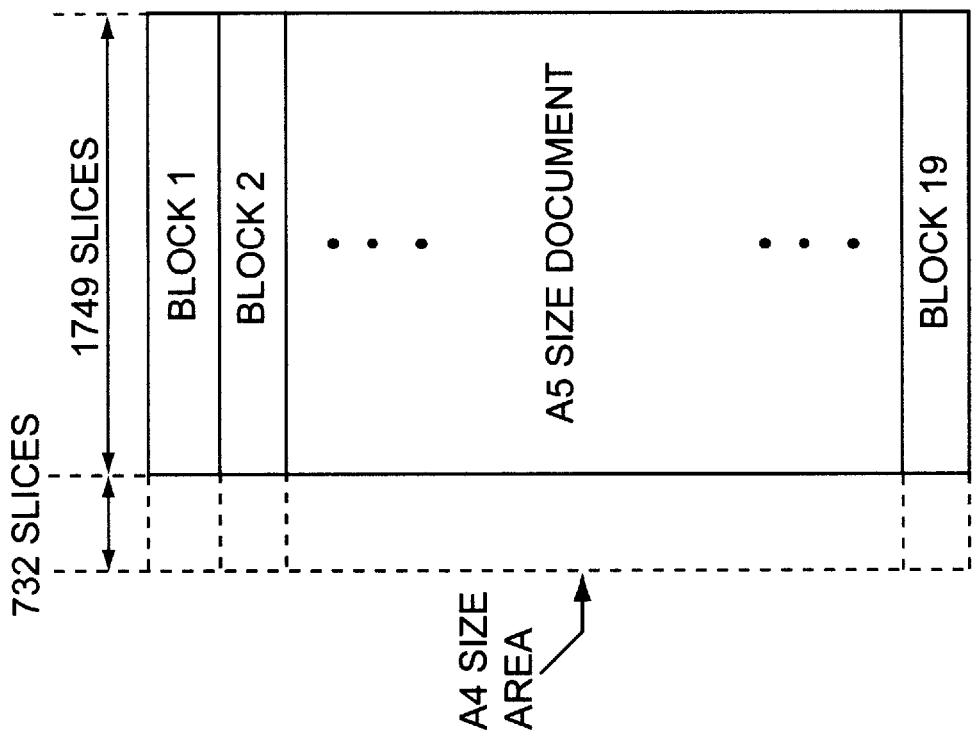
Figure 7A:
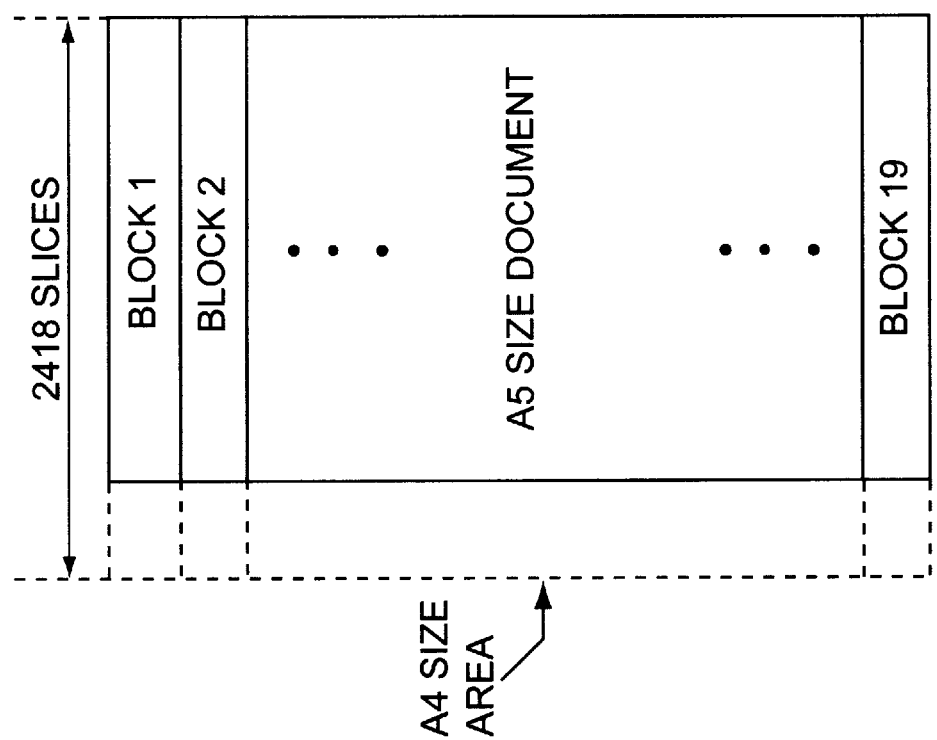

FIGS. 7a and 7b each show a scanning region of a document in accordance with a conventional technique and that of the present invention.

DETAILED DESCRIPTION OF PREFERRED EMBODIMENT

Figure 1:
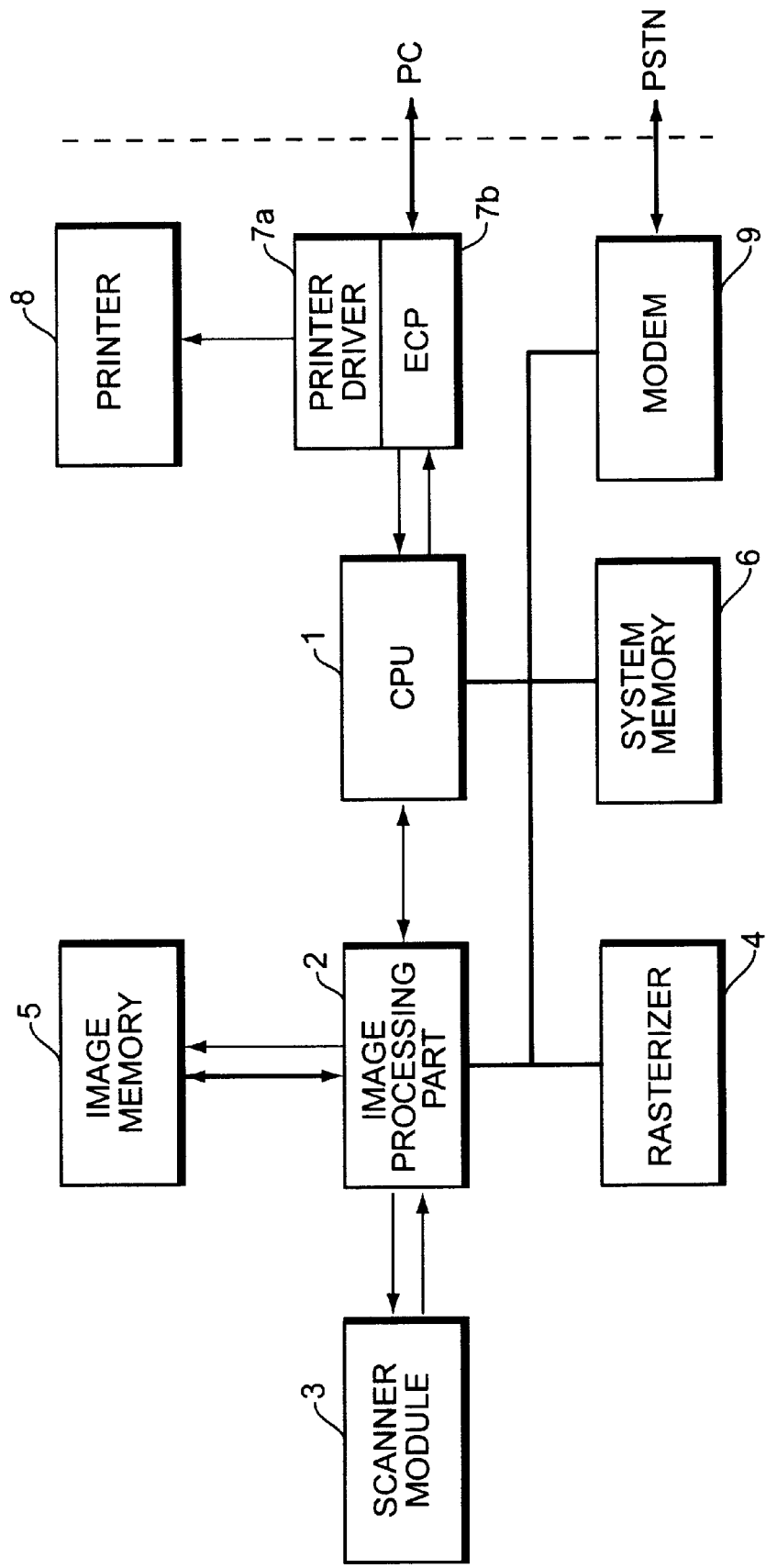
FIG. 1 is a block diagram illustrating the salient features of a multi-tasking system suitable for use in the practice of the present invention.

FIG. 1 is a schematic block diagram of a multi-tasking system using a central processing unit (CPU) 1 to supervise the operation of the multi-tasking system during image scanning and image formation generally. Memory 6 holds a program driving the overall system while image processing unit 2 which controls image data input from a shuttle scanner modules 3 under the control of CPU 1, as well as the shading, gamma correction, dot per inch (DPI) conversion, edge emphasis, error diffusion and other characteristics of the images derived from the image data. Modem 9 modulates or demodulates the processed image data under the control of CPU 1 while ECP 7b controls the printing of images by printer 8 under the direct control of a personal computer that is coupled to the system via ECP 7b.

This multi-tasking system also will typically use rasterizer 4 in order to rasterize image data in blocks. Image memory 5 serves as a buffer memory used for processing image data. System memory 6 may use an erasable and programmable read only memory (i.e., an EPROM) to hold the overall system program. A static random access memory (i.e., a SRAM) may be used for processing system data. Printer driver 7a contols the operation of a print head, a carriage motor, and a line feed motor, as well as the actual printing by printer 8 of images corresponding to the image data. ECP 7b is a module that serves as an interface enabling a direct parallel interface to be established between the system and a personal computer; ECP 7b either transmits scanned data to the personal computer (PC) or receives data from the personal computer.

Figure 2:
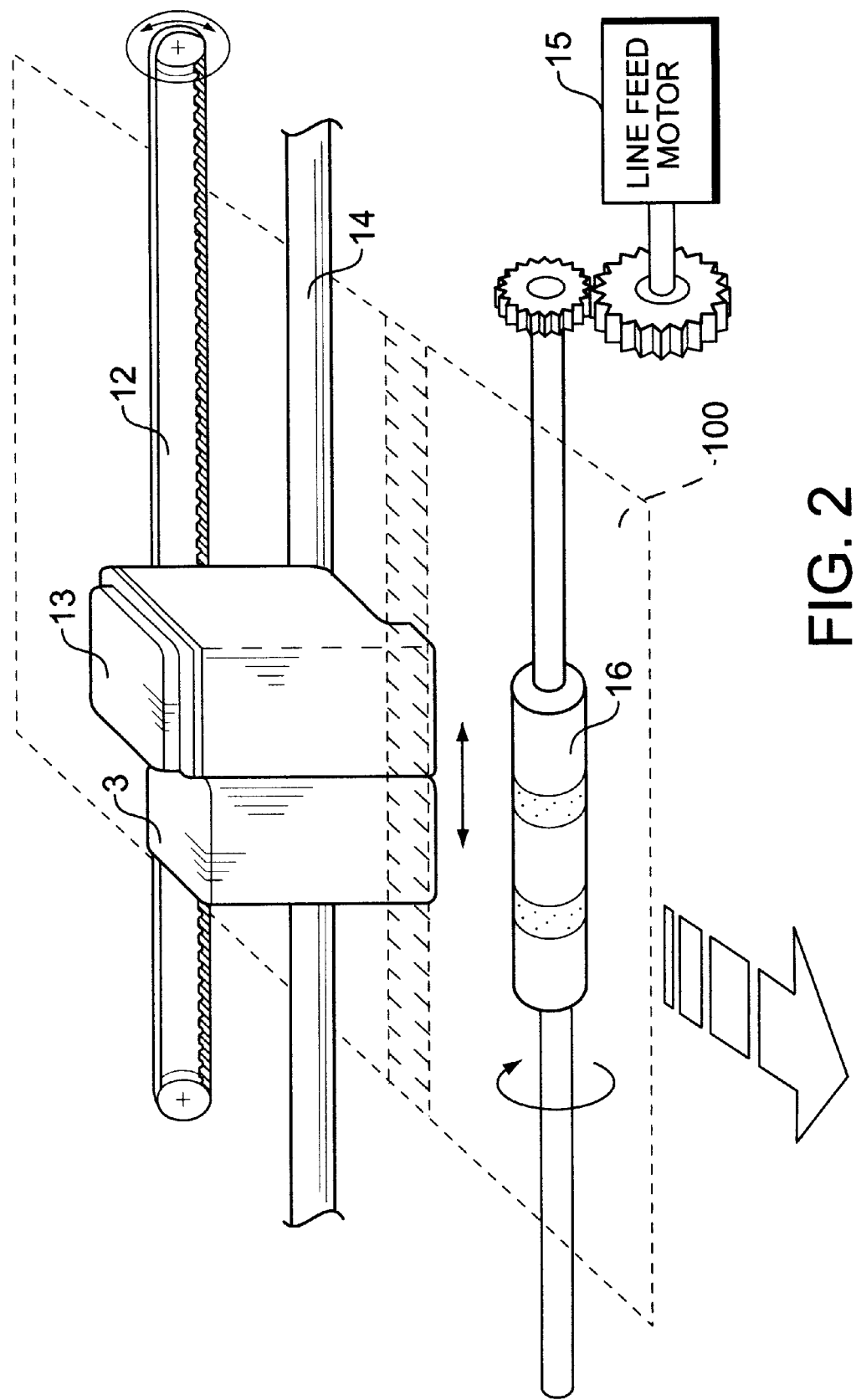
FIG. 2 depicts the details of the construction of the multi-tasking system shown in FIG. 1.

The overall operation of a conventional multi-tasking system may be described by reference to FIG. 2, where scanner module 3 and a printer module 13 each are simultaneously driven by a single timing belt 12 and carriage return motor 11 to reciprocally slide along a horizontal moving shaft 14 transverse to the path of travel of sheet 100 through the system. A single cut sheet 100 of a document is fed along a path and discharged by a line feed roller 16 driven by the operation of a line feed motor 15.

Figure 3:
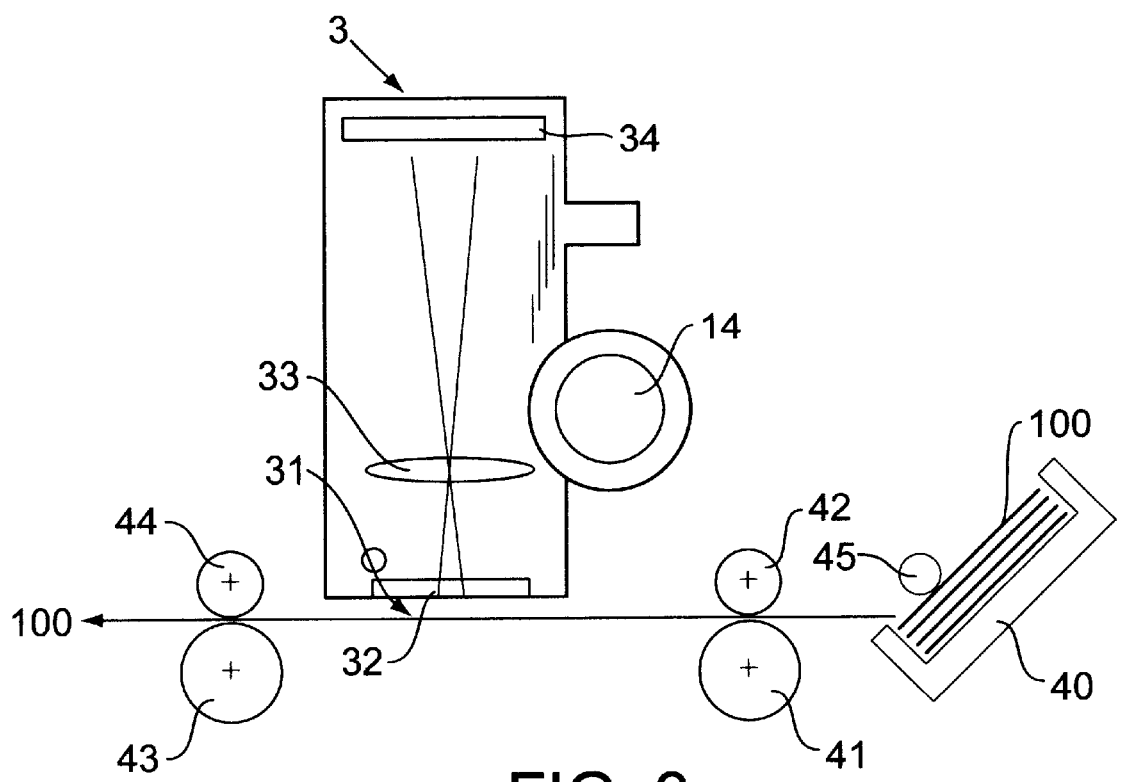
FIG. 3 is a side view of the scanning process followed by the multi-tasking system shown in FIG. 1.

FIG. 3 is a side view of the shuttle scanner module of the multi-tasking system. Document 100 is withdrawn from a paper cassette 40, holding a stack of cut sheets, by roller 45, to be conveyed in a forward direction along path 102 while interposed between driver roller 41 and pinch roller 42 past scanner module 3 and toward feed roller 43. After scanner module 3 completes the scanning process, document 100 is discharged by the applied rotational force of feed roller 43 and pinch roller 44.

In the scanner module 3, a lamp 31 applies light to document 100 while scanner module 3 is moved along shaft 14 and across document 100. The light reflected from the surface of document 100, passes through a scanner glass 32 and is focused on a charge coupled device (CCD) 34 by lens 33 in order to read image data on document 100. CCD 34 is a sensor for converting light energy into electrical energy.

A CCD sensor used for a shuttle scanner module employs 128 to 160 dots and scans A4 paper (2481×3507: 300 dpi) dividing the paper into 22 to 27 shuttle scanning blocks (hereafter: shuttle blocks).

An ink-jet printing module 13 (FIG. 2) consists of a print head having a plurality of nozzles (not shown) for 300 dpi printing, and divides paper into 34 printing blocks (2481× 3507: 300 dpi). This resolution is given by way of example, and the present invention is applicable to other modules having a different number of nozzles and printing resolution.

Figure 5:
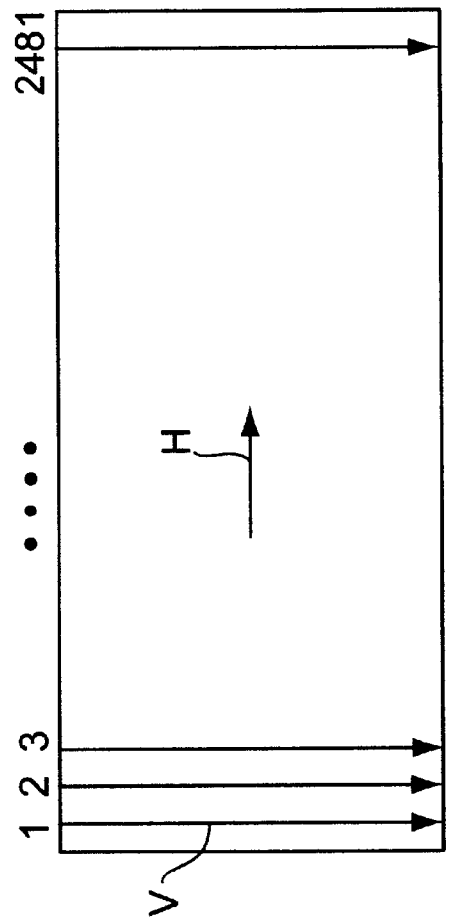
FIG. 5 is a view for scanning each single shuttle block of the plurality of shuttle blocks depicted FIG. 4.
Figure 4:
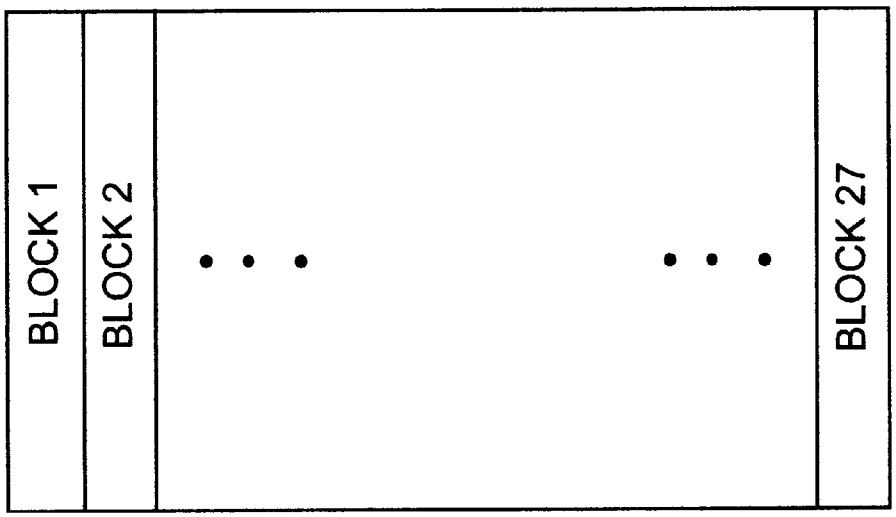
FIG. 4 depicts the control sequence for scanning a document divided into a plurality of shuttle blocks.

FIG. 4 depicts the control sequence for scanning an A4 size document divided into 27 shuttle blocks. FIG. 5 depicts a single shuttle block having 2481 scanning slices for A4 paper scanned at 300 dpi, wherein one slice equals the width of one dot of the CCD. A scanner is moved in the horizontal direction H by a carriage return motor 11 and the 2481 slices, separated by vertical line V, are sequentially scanned by scanner module 3. After scanning the first shuttle block, a point of converting black data at the starting point into white data is checked out.

Figure 6:
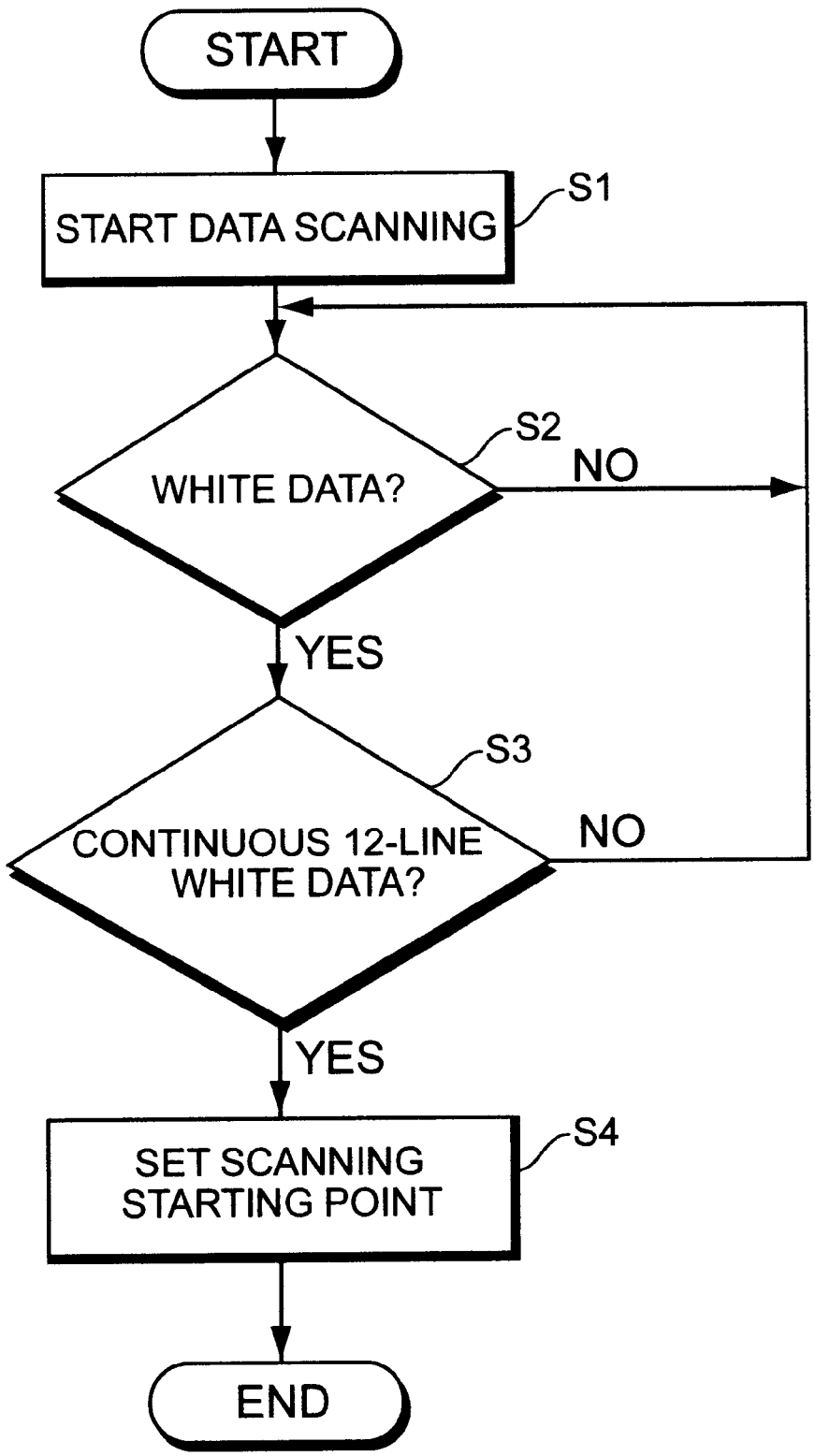
FIG. 6 depicts a control sequence for recognizing a paper size.

The control sequence of setting a data scanning starting point is depicted in FIG. 6. A method of setting a scanning region of one shuttle block includes the steps of starting a scanning operation in step S1 and the first slice of the shuttle block is scanned. In step S2 a determination is made as to whether or not all the scanned data in the first slice is white data, and if it is determined that all the scanned data is not white data in step S2 the the next slice is scanned in step S2. When it is determined that all the data in a scanned slice is white data, then step S3 is performed to determine whether twelve (12) consecutively scanned slices of white data have been scanned. In the present case, twelve consecutive slices corresponds to an area 1 mm wide and each slice has a vertical resolution of 130 dots. The process returns to step S2 if it is determined that twelve consecutive slices have not been scanned. If it is determined that twelve consecutive slices have been scanned, then in step S4, a data scanning starting point is set for scanning the rest of the slices in the first shuttle block. Here, the next to last slice of white data scanned, i.e., the eleventh successive slice of all white data, is set as the scanning starting point and is scanned again so that the data can be stored in image memory 5. As the data of the first shuttle block is scanned, it is stored in image memory 5. The process of FIG. 6 is repeated for each of the remaining 26 shuttle blocks. Once all the information is stored in image memory 5 it can be read out for printing in a copy mode, transmission in a facsimile mode or provided to a computer for display on a screen of a monitor in a scanning mode.

In a conventional copy operation, when a paper of A5 size is to be copied, the whole region for A4 paper is scanned, as shown in FIGS. 7a and that region scanned which is not the scanned A5 size paper is stored in image memory as black data because there will be no reflection of light to the CCD. Accordingly, when the print operation occurs, which will use A4 paper as a print medium, then there will be a wide area of continuously printed black data, and ink is wasted resulting in a copy of poor quality.

With respect to FIG. 7B, according to the present invention, when a paper of A5 size is to be copied, the scanner scans slices of the first shuttle block and checks for twelve consecutive slices having only white data. Thus, if the paper is A5 size (1749×2481: 300 dpi) then the initial 732 slices will provide an indication of black data because no light will be reflected back to the CCD in the scanner module. Then slices 733 through 744 should correspond to twelve consecutive slices of white data. If so, then the initial 732 slices of data are ignored and the scanning of print data starts at slice number 743. The data in slices 743 through 1749 are scanned and stored in image memory. Accordingly, when data is printed out from image memory, there will be no ink wasted.

As described above, the present invention recognizes the paper size by checking a continuous 12-line white data region in the shuttle scan mechanism. In the present invention, the data about the rest of document other than its text region is nullified and printing is carried out with respect to the actual text region of document, which minimizes unnecessary ink consumption and avoids paper damage.

What is claimed is:

1. A method of recognizing a printing region, comprising the steps of:

scanning a first block of a document divided into a plurality of blocks;

confirming a point of converting black data at a starting point into white data;

detecting a point of starting white data of predetermined lines continuously input within a single block; and setting as a scanning starting point a value obtained by subtracting the white data starting point from the number of dots corresponding to a resolution and then adding 1 thereto.

2. A method of recognizing a printing region according to claim 1, wherein a point when white data of more than 12 lines are continuously input in a single shuttle block, is recognized as a scanning starting point.

3. A method of recognizing a printing region in a multi-tasking system that is a combination of a printer, facsimile copier and scanner, said method comprising the steps of:

starting a scanning operation in a copy mode and scanning a first portion of a document to be copied;

determining whether twelve consecutive lines of all white data have been scanned;

establishing a scanning start point when it is determined that twelve consecutive lines of all white data have been scanned;

scanning said first portion starting at said scanning start point and storing scanned data in an image memory, wherein said scanned data stored in said image memory corresponds to said printing region.

4. The method as set forth in claim 3, wherein said step of establishing said scanning starting point comprises setting an eleventh one of said twelve consecutive lines of all white data as said scanning starting point.

5. The method as set forth in claim 3, further comprising:

moving a scanner across said document in a direction transverse to a direction of movement of said document when said document is fed along a predetermined path of said multi-tasking system during said copy mode.

6. The method as set forth in claim 3, further comprising:

repeating each of said steps for each portion of said document to be copied.

7. A method of recognizing a print region of a document in a multi-tasking system, said method comprising the steps of:

starting a scanning operation in one of a copy mode, facsimile mode, printer mode and scanner mode and scanning a first portion of said document;

scanning said document while moving a scanner, from a home position, across said document in a direction transverse to a direction of movement of said document when said document is fed along a predetermined paper path of said multi-tasking system;

determining whether a predetermined number of consecutive lines of all white data have been scanned, wherein said lines extend in a direction transverse to the moving direction of said scanner;

subtracting one from said predetermined number, when it is determined that said predetermined number of consecutive lines of all white data have been scanned;

establishing a scanning start point at a line corresponding to the result of the subtracting step;

scanning said first portion of said document starting at said scanning start point and storing scanned data in an image memory, wherein said scanned data stored in said image memory corresponds to said print region.

8. The method as set forth in claim 7, wherein said predetermined number is twelve and said step of establishing said scanning starting point comprises setting an eleventh one of said twelve consecutive lines of all white data as said scanning starting point.

9. The method as set forth in claim 7, further comprising:

moving said scanner across said document to said home position to scan a next portion of said document and performing said step of scanning to scan said next portion of said document.

10. The method as set forth in claim 9, further comprising:

repeating each of said steps for each consecutive portion of said document until said document is completely scanned and the scanned data in each of said portions is stored in said image memory.

* * * * *